United States Patent [19]
Komachi

[11] Patent Number: 5,839,320
[45] Date of Patent: Nov. 24, 1998

[54] ACTUATOR

[75] Inventor: Hiroshi Komachi, Tokyo, Japan

[73] Assignee: Harada Industry Co., Ltd., Tokyo, Japan

[21] Appl. No.: 762,432

[22] Filed: Dec. 9, 1996

[30] Foreign Application Priority Data

Dec. 11, 1995 [JP] Japan .................................... 7-321883

[51] Int. Cl.⁶ .............................. F16H 1/16; F16H 57/02; H05K 5/04
[52] U.S. Cl. ........................... 74/425; 74/606 R; 310/89; 310/91; 403/335
[58] Field of Search ................................ 74/425, 606 R; 310/89, 91; 403/335, 338, 375

[56] References Cited

U.S. PATENT DOCUMENTS

| | | | |
|---|---|---|---|
| 1,773,420 | 8/1930 | Bardwell | 310/91 |
| 4,094,207 | 6/1978 | Fischer | 74/425 |
| 4,147,063 | 4/1979 | Bower et al. | 74/5 F X |

Primary Examiner—Allan D. Herrmann
Attorney, Agent, or Firm—John P. White; Cooper & Dunham LLP

[57] ABSTRACT

Disclosed is an actuator, comprising a casing prepared by integrally bonding a first case member and a second case member which are separated from each other in an axial direction of the casing, bracket holding portions formed to provide a pair on the inner surfaces of the first and second case members, a motor having a mounting bracket and housed in the casing with the mounting bracket held by the bracket holding portions, a worm gear mounted to a rotary shaft of the motor, and an operating section including a worm wheel which is rotated in mesh with the worm gear so as to impart a predetermined driving force to an adjustment section of an apparatus to be controlled, wherein the bracket holding portion of the first case member includes a groove formed along an inner peripheral portion of the holding portion for receiving one peripheral portion of the mounting bracket of the motor, and the bracket holding portion of the second case member includes a pushing portion formed along an inner peripheral portion of the holding portion for pushing the other peripheral portion of the mounting bracket of the motor.

15 Claims, 3 Drawing Sheets

ACTUATOR

BACKGROUND OF THE INVENTION

1. Field of the Invention

The present invention relates to an actuator for controlling the driving of an adjustment section of an apparatus to be controlled such as an air conditioner in response to a control signal given from a control device.

2. Description of the Related Art

A conventional actuator comprises a motor as a driving source and a case in which the motor is held by a so-called cantilever supporting system.

FIG. 6 is an oblique view showing in a dismantled fashion the construction of the conventional actuator. As shown in the drawing, an actuator 20 comprises a housing case 21, a motor 24 housed within the case 21, a worm gear 25 attached to a rotary shaft 24a of the motor 24, and an operating section 27 including a worm wheel 26 which is rotated in mesh with the worm gear 25. A predetermined driving force is transmitted via the operating section 27 to the adjustment section (not shown) of the apparatus to be controlled such as an air conditioner so as to drive the adjustment section.

The housing case 21 is obtained by integrally bonding a first case member 21a and a second case member 21b which are separated from each other in the axial direction of the rotary shaft 24a of the motor 24. Bracket holding portions 22a and 22b, which form a pair, are formed along the inner surfaces of the first and second case members 21a, 21b, respectively. When the first and second case members 21a and 21b are bonded to each other, the upper end of the bracket holding portion 22a is aligned with the lower end of the bracket holding portion 22b. Thus, a mounting bracket 23 of the motor 24 is held by these bracket holding portions 22a and 22b, with the result that the motor 24 is held stable within the case 21. Incidentally, a reference numeral 24b denotes cables leading to the power source of the motor 24.

A groove C is formed in the bracket holding member 22a of the first case member 21a such that the lower half in the peripheral portion of the mounting bracket 23 can be inserted into the groove C. Likewise, a groove D is formed in the bracket holding member 22b of the second case member 21b such that the upper half in the peripheral portion of the mounting bracket 23 can be inserted into the groove D. In other words, the lower and upper halves in the peripheral portion of the mounting bracket 23 of the motor 24 are supported by the bracket holding members 22a ad 22b, respectively.

As described above, the conventional actuator 20 is constructed such that the motor 24 is held within the housing case 21 by a so-called cantilever supporting system. The cantilever supporting system is advantageous in various respects over the system for supporting the motor at both ends. For example, the cantilever supporting system is simpler in construction. Also, application of an unnatural external force to the motor itself need not be worried about in assembling the actuator.

However, if the bracket holding portion 22a of the first case member 21a is deviated in the axial direction of the rotary shaft 24a of the motor 24 from the bracket holding portion 22b of the second case member 21b, the peripheral portion of the mounting bracket 23 fails to be inserted accurately into the grooves C and D. In this case, the bracket holding portions 22a and 22b fail to support the mounting bracket 23 of the motor 24 as desired, even if the deviation in the axial direction noted above is very small. Even if the mounting bracket 23 itself can be supported, the motor axis tends to be inclined about the bracket 23, giving rise to inclination of the worm gear 25. If the worm gear 25 is inclined, the leading angle of the worm gear 25 fails to conform with the leading angle of the worm wheel 26. As a result, a grating noise is generated by an unnatural frictional sliding between the gears, leading to an increased operational noise.

SUMMARY OF THE INVENTION

An object of the present invention is to provide a cantilever holding type actuator which permits a motor itself to be held at a normal posture so as to prevent a grating noise from being generated by an unnatural frictional sliding between adjacent gears and, thus, to suppress an operation noise, even if a bracket holding portion of a first case member is deviated in the axial direction of the rotary shaft of the motor from a bracket holding portion of a second case member because of an error in the manufacturing process of the actuator parts so as to cause these bracket holding portions to fail to conform with each other.

In order to achieve the above object, the actuator of the present invention is constructed as follows:

(1) An actuator, comprising:

a casing prepared by integrally bonding a first case member and a second case member which are separated from each other in an axial direction of the casing;

bracket holding portions formed to provide a pair on the inner surfaces of the first and second case members, respectively, such that these bracket holding portions conform with each other when the first and second case members are bonded to each other;

a motor having a mounting bracket consisting of a flat plate perpendicular to the axial direction of the casing and housed in the casing with the mounting bracket held by the bracket holding portions;

a worm gear mounted to a rotary shaft of the motor; and an operating section including a worm wheel which is rotated in mesh with the worm gear so as to impart a predetermined driving force to an adjustment section of an apparatus to be controlled, wherein the bracket holding portion of the first case member includes a groove formed along an inner peripheral portion of the holding portion for receiving one peripheral portion of the mounting bracket of the motor, and the bracket holding portion of the second case member includes a pushing portion formed along an inner peripheral portion of the holding portion for pushing the other peripheral portion of the mounting bracket of the motor.

(2) The actuator as defined in item (1) above, wherein the pushing portion is constructed to impart a pushing force to the mounting bracket of the motor via an elastic member.

(3) The actuator as defined in item (1) above, wherein the mounting bracket of the motor includes a plurality of projections from the periphery, the tip portion of each of the projections being capable of insertion into the groove formed in the bracket holding portion of the first case member.

(4) The actuator as defined in item (3) above, wherein at least that projection of the plural projections which is inserted into a bottom portion of the groove of the bracket holding portion includes a tip portion capable of elastic deformation such that, when the projection is inserted into the groove, the tip portion is pressed against the bottom portion of the groove so as to be elastically deformed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS (First Embodiment)

Figure 1:
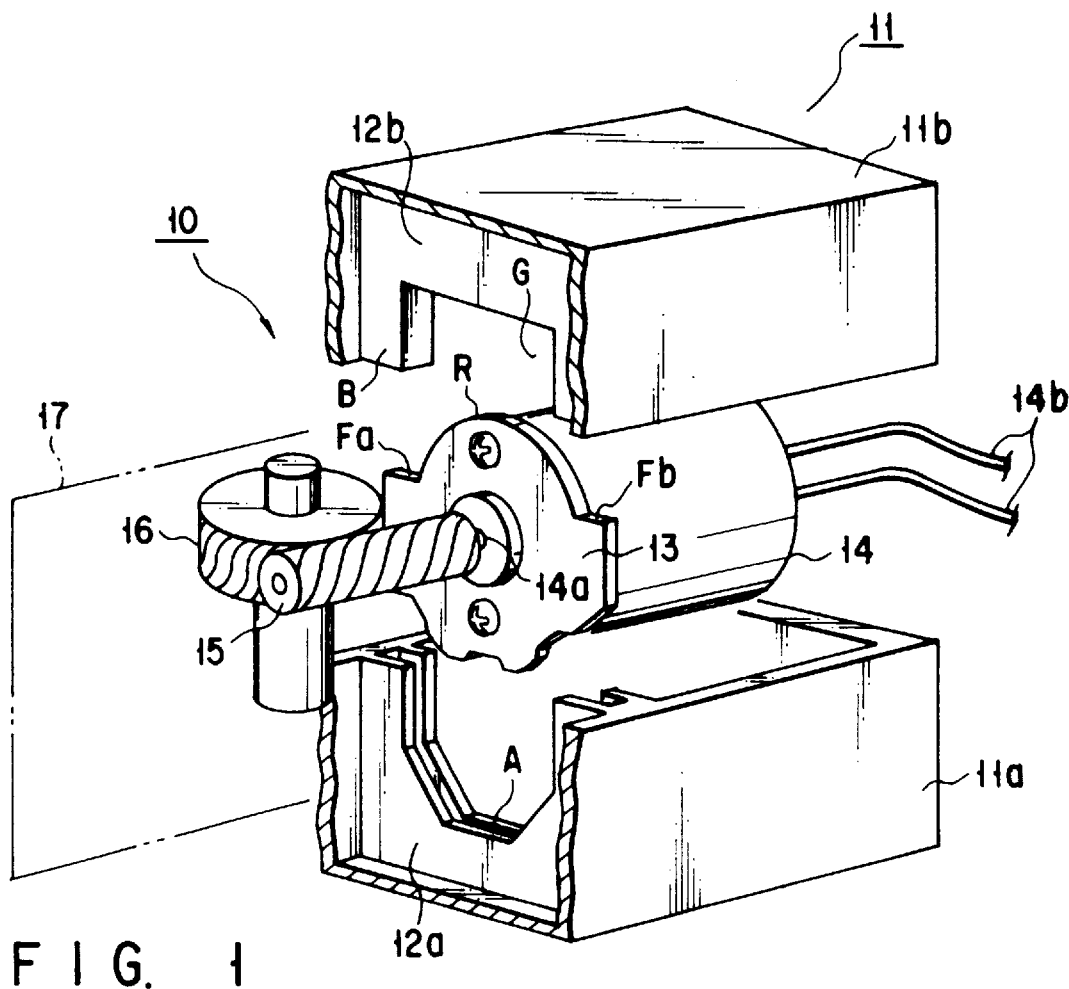
FIG. 1 is an oblique view showing in a dismantled fashion a part of the casing included in an actuator according to a first embodiment of the present invention.
Figure 2:
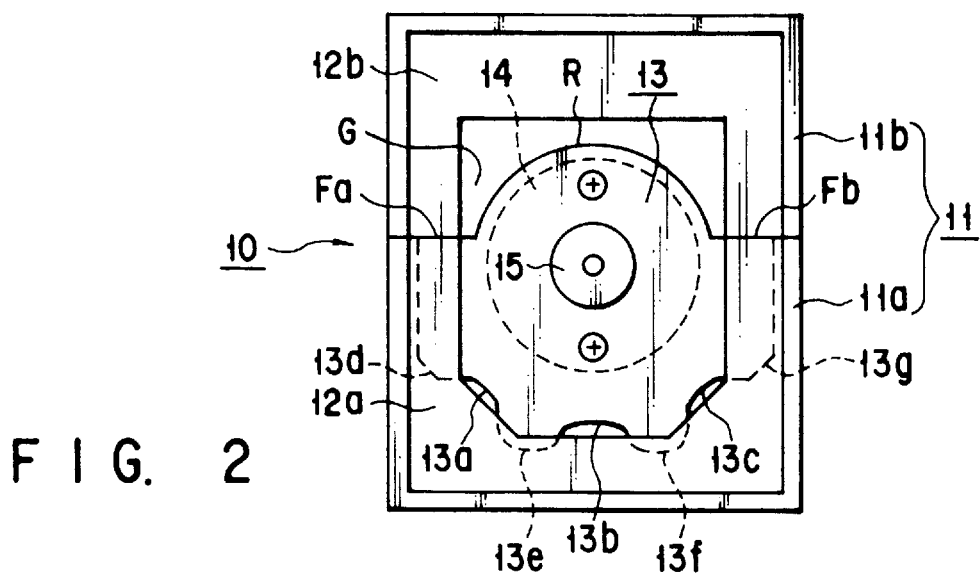
FIG. 2 is a front view showing that a mounting bracket of a motor is held by a pair of bracket holding portions in the actuator according to the first embodiment of the present invention.

FIGS. 1 and 2 collectively show the construction of an actuator 10 according to a first embodiment of the present invention. In this embodiment, the actuator is applied to an apparatus to be controlled such as an air conditioner.

As seen from the drawings, the actuator 10 is constructed to transmit the rotating force of a motor 14 held within a casing 11, which is rectangular in cross section, to the outside through a worm gear 15 and an operating section 17 including a worm wheel 16. It should be noted that other cross sectional configurations for the casing, such as cylindrical, are also contemplated.

The casing 11 made of, for example, a synthetic resin is prepared by integrally bonding a first case member 11a (lower half) and a second case member 11b (upper half), which are separated from each other in an axial direction of the cylindrical casing. A bracket holding portion 12a is formed along the inner surface of the first case member 11a. Likewise, a bracket holding portion 12b is formed along the inner surface of the second case member 11b. These bracket holding portions 12a and 12b are positioned to permit the upper end of the bracket holding portion 12a to abut against the lower end of the bracket holding portion 12b when the first and second case members are bonded to each other.

The motor 14, which is housed within the casing 11, has at one end a mounting bracket 13 consisting of a flat plate perpendicular to the axial direction of the casing 11. It should be noted that the mounting bracket 13 is held by the bracket holding portions 12a and 12b such that the motor 14 is supported within the casing 11 by a cantilever supporting system. Incidentally, a reference numeral 14b denotes cables connected to the power source of the motor 14.

A worm gear 15 is mounted to a rotary shaft 14a of the motor 14. A worm wheel 16 is in mesh with the worm gear 15. An operating section 17 including the worm wheel 16 serves to transmit the rotating force itself of the worm wheel 16 to an adjustment section of an apparatus to be controlled to drive the adjustment section. Alternatively, rotation of the worm wheel 16 is converted into a reciprocating movement and, then, transmitted to the adjustment section to drive the adjustment section.

A groove A into which one peripheral portion (lower portion) of the mounting bracket 13 of the motor 14 can be inserted is formed in the bracket holding portion 12a of the first case member 11a. On the other hand, the inner peripheral portion of the bracket holding portion 12b of the second case member 11b includes a pushing portion B, which permits pushing downward the other peripheral portion (upper portion) of the mounting bracket 13.

In this embodiment, recesses 13a to 13c are formed in one peripheral portion (lower portion) of the mounting bracket 13 of the motor 14. As apparent from FIG. 2, the recess 13b is formed in the lowest position of the mounting bracket 13, with the other recesses 13a and 13c being formed in corner portions in a manner to have the recess 13b interposed therebetween. The presence of these recesses permits projections 13d to 13g to be formed in one peripheral portion (lower portion) of the mounting bracket 13. In other words, a plurality of, i.e, four in this embodiment, projections 13d to 13g are formed along the periphery in one portion (lower portion) of the mounting bracket 13. The tip portions of these projections 13d to 13g are inserted into the groove A formed in the bracket holding portion 12a of the first case member 11a.

Flat surfaces Fa and Fb are formed on both end portions of the other peripheral portion (upper portion) of the mounting bracket 13. A semi-circular region R is formed on the central portion of the other peripheral portion (upper portion) of the mounting bracket 13. It should be noted that the pushing portion B of the bracket holding portion 12b abuts against these flat surfaces Fa and Fb. Further, a clearance G is formed between the semi-circular region R and the inner peripheral portion of the bracket holding portion 12b of the second case member 11b.

As described above, the actuator 10 in this embodiment is constructed such that the groove A into which the peripheral portion of the mounting bracket 13 can be inserted is formed in only the inner peripheral portion of the bracket holding portion 12a of the first case member 11a. Also, the pushing portion B for pushing downward the other peripheral portion (upper portion) of the mounting bracket 13 is formed in the inner peripheral portion of the bracket holding portion 12b of the second case member 11b.

Figure 3:
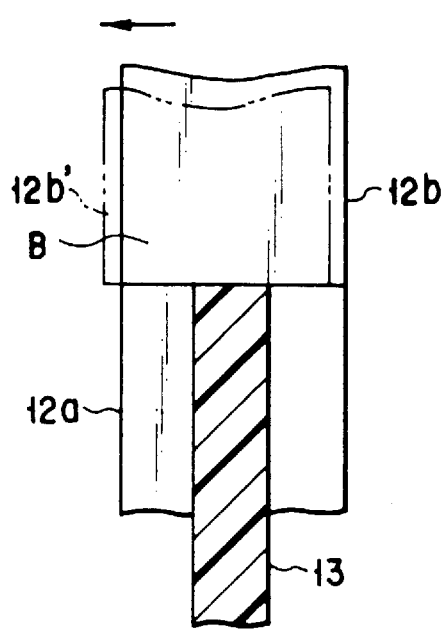
FIG. 3 is a cross sectional view, as seen sidewalk, showing in a magnified fashion how the mounting bracket of the motor is engaged with the bracket holding portions in the actuator according to the first embodiment of the present invention.

The particular construction permits producing a prominent effect as shown in, for example, FIG. 3. Specifically, suppose that the bracket holding portion 12b is deviated in the axial direction of the motor 14 from the bracket holding portion 12a as denoted by an arrow (see reference numeral 12b') because of, for example, a dimensional error in the manufacturing process, resulting in failure for these bracket holding portions 12a and 12b to abut against each other as desired. Even in this case, the particular positional deviation can be automatically absorbed because the pushing portion B of the bracket holding portion 12b is simply allowed to push the flat surfaces Fa, Fb included in the other peripheral portion (upper portion) of the mounting bracket 13 of the motor 14.

As described above, the motor 14 itself is enabled to maintain its normal posture, with the result that the rotary shaft 14a or the worm gear 15 is prevented from being inclined because of the dimensional error noted above. As a result, the leading angle of the worm gear 15 is prevented from failing to conform with the leading angle of the worm wheel 16, making it possible to suppress generation of a grating noise caused by an unnatural frictional sliding between the gears. It follows that it is possible to obtain an actuator which permits suppressing the operational noise.

It should also be noted that the mounting bracket 13 of the motor 14 is constructed in this embodiment such that the tip portions alone of the projections 13d to 13g formed in one peripheral portion (lower portion) are inserted into the groove A formed in the bracket holding portion 12a of the first case member 11a, making it possible to diminish the contact area between the mounting bracket 13 and the bracket holding portion 12a. What should also be noted is that the clearance G is formed between the other peripheral portion (upper portion) of the mounting bracket 13 and the inner peripheral portion of the bracket holding portion 12b except the pushing portion B which is brought into contact with the flat surfaces Fa and Fb of the mounting bracket 13. As a result, the vibration of the motor 14 is attenuated by the clearance including the clearance G between the mounting bracket 13 and the bracket holding portions 12a, 12b and, thus, is unlikely to be transmitted to the casing 11. It follows that it is possible to suppress generation of the vibration noise caused by the mechanical resonance of the casing 11.
(Second Embodiment)

Figure 4:
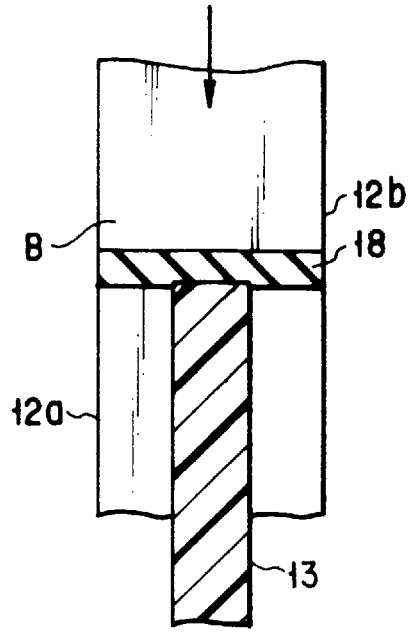
FIG. 4 is a cross sectional view, as seen sideward, showing in a magnified fashion how a mounting bracket of the motor is engaged with a pair of bracket holding portions in the actuator according to a second embodiment of the present invention.

FIG. 4 is a cross sectional view, as seen sideward, showing in a magnified fashion how the mounting bracket 13 of the motor 14 is engaged with the bracket holding portions 12a, 12b in the actuator according to a second embodiment of the present invention.

As seen from the drawing, an elastic member 18 made of, for example, a rubbery material is used in the second embodiment. Specifically, a pushing force is applied, as denoted by an arrow, by the pushing portion B to the mounting bracket 13 whose upper end slightly projects upward from the upper surface of the bracket holding portion 12a via the elastic member 18.

In the second embodiment, the pushing force of the pushing portion B can be transmitted without fail to the mounting bracket 13 when the first case member 11a and the second case member 11b are bonded to each other. As a result, one peripheral portion (lower portion) of the mounting bracket 13 can be inserted into and secured stable to the groove A formed in the bracket holding portion 12a of the first case member 11a.
(Third Embodiment)

Figure 5:
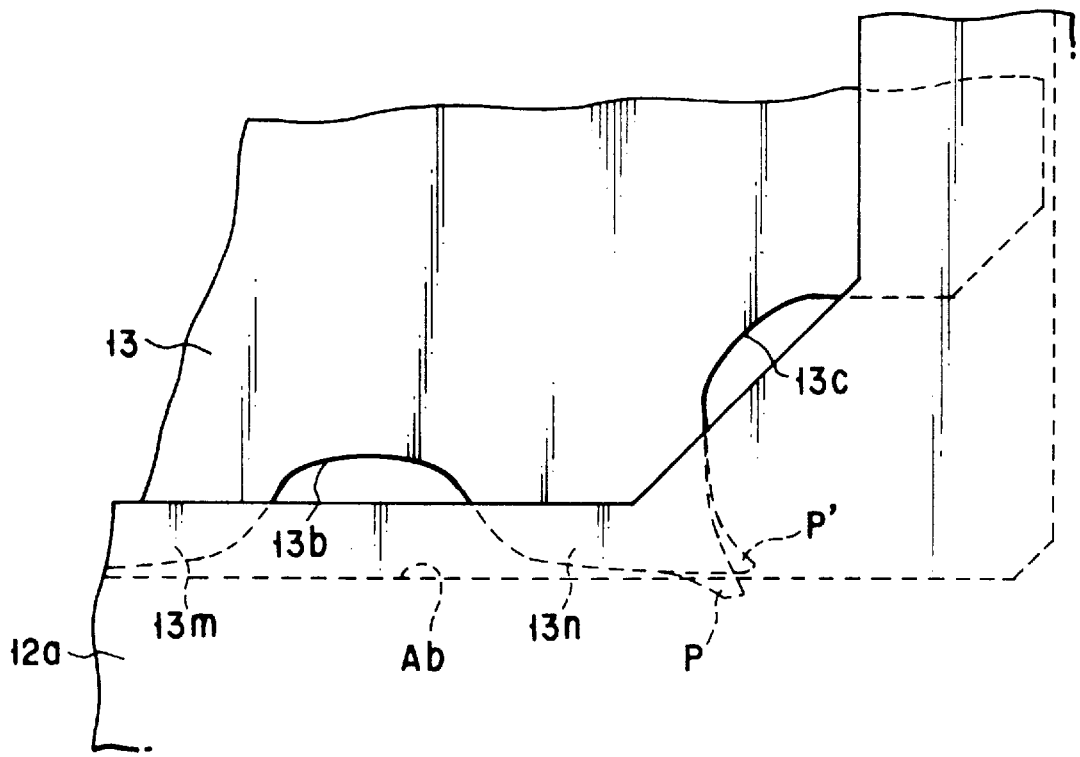
FIG. 5 is a front view showing in a magnified fashion the positional relationship between the peripheral portion of a mounting bracket of the motor and a groove of the bracket holding portion in an actuator according to a third embodiment of the present invention.
Figure 6:
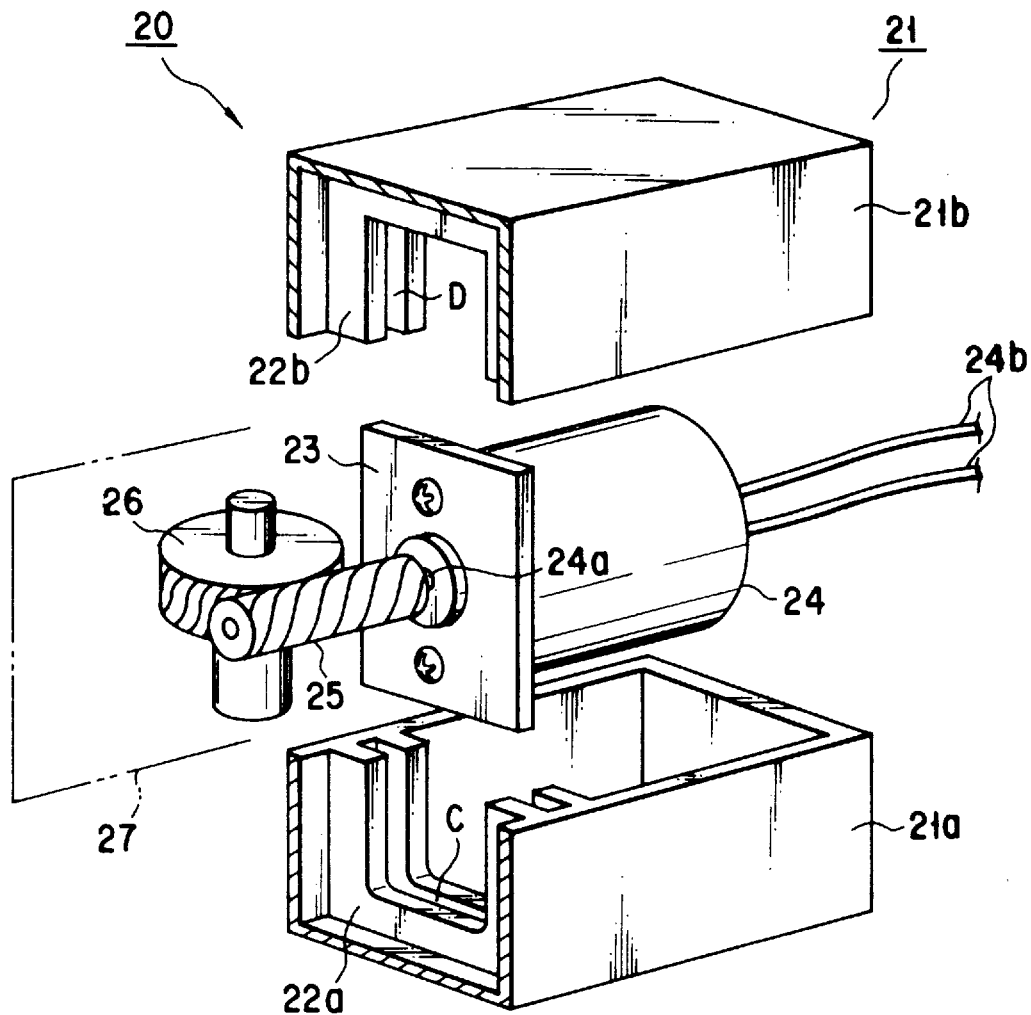
FIG. 6 is an oblique view showing in a dismantled fashion a part of the casing included in a conventional actuator.

FIG. 5 is a front view showing in a magnified fashion the positional relationship between the peripheral portion of the mounting bracket 13 of the motor 14 and the groove A of the bracket holding portion 12a in the actuator according to a third embodiment of the present invention.

As shown in the drawing, at least projections 13m and 13n included in the plural projections of the mounting bracket 13 of the motor 14, said projections 13m and 13n being inserted into a bottom portion Ab of the groove A formed in the bracket holding portion 12a, include elastically deformable tip portions P in this embodiment. When these projections 13m and 13n are inserted into the groove A, the tip portions P are pressed against the bottom portion Ab of the groove A so as to be elastically deformed as denoted by reference symbols P'.

If a pushing force is applied by the pushing portion B to the mounting bracket 13 in the third embodiment when the first case member 11a and the second case member 11b are bonded to each other, the projections 13m and 13n are pushed into the groove A such that the tip portions P of these projections are pressed against the bottom portion Ab of the groove A so as to be elastically deformed as denoted by a reference symbol P'. What should be noted is that the repulsive force generated by the elastic deformation causes the mounting bracket 13 to be held with a higher stability by the bracket holding portions 12a and 12b. It follows that the function and effect similar to those obtained in the second embodiment can also be obtained in the third embodiment, though the elastic member 18 used in the second embodiment is not used in the third embodiment.
(Modifications)

The actuators according to the embodiments of the present invention described above can be modified as follows:

i) The actuator can be modified to include both the elastic member 18 used in the second embodiment and the elastic tip portions P used in the third embodiment.

ii) The actuator can be modified to permit the rotating speed of the worm wheel 16 to be lowered by using decelerating gears such as a single or a plurality of spur gears, followed by transmitting the lowered rotating speed to an apparatus to be controlled.
(Merits of the Embodiments and Modifications)

The constructions, functions and effects of the actuators according to the embodiments of the present invention and modifications thereof can be summarized as follows:

[1] The actuator according to the embodiments of the present invention comprises a casing prepared by integrally bonding the first case member 11a and the second case member 11b which are separated from each other in an axial direction of the casing;

bracket holding portions 12a, 12b formed to provide a pair on the inner surfaces of said first and second case members 11a, 11b, respectively, such that these bracket holding portions 12a, 12b conform with each other when the first and second case members 11a, 11b are bonded to each other;

a motor 14 having a mounting bracket 13 consisting of a flat plate perpendicular to the axial direction of the casing and housed in said casing 11 with said mounting bracket 13 held by said bracket holding portions 12a, 12b;

a worm gear 15 mounted to a rotary shaft 14a of said motor 14; and an operating section 17 including a worm wheel 16 which is rotated in mesh with said worm gear 15 so as to impart a predetermined driving force to an adjustment section of an apparatus to be controlled, wherein the bracket holding portion 12a of the first case member 11a includes a groove A formed along an inner peripheral portion of said holding portion 12a for receiving one peripheral portion of said mounting bracket 13 of the motor 14, and the bracket holding portion 12b of the second case member 11b includes a pushing portion B formed along an inner peripheral portion of said holding portion 12b for pushing the other peripheral portion of the mounting bracket 13 of the motor 14.

The actuator of the particular construction produces a prominent effect that, even if the bracket holding portions 12a and 12b fail to conform with each other as desired because of a dimensional error made in the manufacturing process in the axial direction of the motor between the bracket holding portion 12a of the first case member 11a and the bracket holding portion 12b of the second case member 11b, the motor 14 itself is enabled to maintain its normal posture, because the pushing portion B of the bracket holding portion 12b is simply allowed to push the other peripheral portion of the mounting bracket 13 of the motor 14. Naturally, inclination of the rotary shaft 14a of the motor 14 or the worm gear 15, which is derived from the dimensional error noted above, need not be worried about. As a result, the leading angle of the worm gear 15 is prevented from failing to conform with the leading angle of the worm wheel 16, making it possible to suppress generation of a grating noise caused by an unnatural frictional sliding between the gears. It follows that it is possible to obtain an actuator which permits suppressing the operational noise.

[2] The actuator according to the embodiments of the present invention defined in item [1] is constructed such that said pushing portion B is constructed to impart a pushing force to the mounting bracket 13 of the motor 14 via an elastic member 18.

The particular actuator produces the function and effect similar to those produced by the actuator defined in item [1]. In addition, the pushing force of the pushing portion B can be imparted to the mounting bracket 13 with a high stability when the first and second case members 11a and 11b are bonded to each other, with the result that one peripheral portion (lower portion) of the mounting bracket 13 can be inserted without fail into the groove A formed in the bracket holding portion 12a of the first case member 11a.

[3] The actuator according to the embodiments of the present invention defined in item [1] is constructed such that said mounting bracket 13 of the motor 14 includes a plurality of projections 13d to 13g from the periphery, the tip portion of each of said projections 13d to 13g being capable of insertion into said groove A formed in the bracket holding portion 12a of the first case member 11a.

The particular actuator produces the function and effect similar to those produced by the actuator defined in item [1]. In addition, since the contact area between the mounting bracket 13 and the bracket holding portion 12a is diminished, vibration of the motor 14 is attenuated by the presence of the clearance between the mounting bracket 13 and the bracket holding portions 12a, 12b and, thus, is unlikely to be transmitted to the casing 11. It follows that it is possible to suppress generation of the vibrating noise caused by the mechanical resonance of the casing 11.

[4] The actuator according to the embodiments of the present invention defined in item [1] is constructed such that at least projections 13m and 13n of said plural projections, said projections 13m and 13n being inserted into a bottom portion Ab of the groove A of the bracket holding portion 12a, include tip portions P capable of elastic deformation such that, when said projections 13m and 13n inserted into the groove A, said tip portions P are pressed against the bottom portion Ab of the groove A so as to be elastically deformed.

The particular actuator produces the function and effect similar to those produced by the actuator defined in item [3].

In addition, if the pushing force of the pushing portion B is applied to the mounting bracket 13 of the motor 14 when the first and second case members 11a and 11b are integrally bonded to each other, the projections 13m and 13m are pushed into the groove A so as to be pressed against the bottom portion Ab of the groove A. As a result, the tip portions P of these projections are elastically deformed as denoted by a symbol P' in FIG. 3. It follows that the repulsive force of the elastic deformation causes the mounting bracket 13 of the motor 14 to be held with a higher stability by the bracket holding portions 12a, 12b.

[5] Additional modifications and advantages will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. An actuator, comprising:

a casing prepared by integrally bonding a first case member and a second case member which are separated from each other in an axial direction of the casing;

bracket holding portions formed to provide a pair on the inner surfaces of said first and second case members, respectively, such that these bracket holding portions conform with each other when the first and second case members are bonded to each other;

a motor having a mounting bracket consisting of a flat plate perpendicular to the axial direction of the casing and housed in said casing with said mounting bracket held by said bracket holding portions;

a worm gear mounted to a rotary shaft of said motor; and an operating section including a worm wheel which is rotated in mesh with said worm gear so as to impart a predetermined driving force to an adjustment section of an apparatus to be controlled, wherein the bracket holding portion of the first case member includes a groove formed along an inner peripheral portion of said holding portion for receiving one peripheral portion of said mounting bracket of the motor, and the bracket holding portion of the second case member includes a pushing portion formed along an inner peripheral portion of said holding portion for pushing the other peripheral portion of the mounting bracket of the motor.

2. The actuator according to claim 1, wherein said pushing portion is constructed to impart a pushing force to the mounting bracket of the motor via an elastic member.

3. The actuator according to claim 1, wherein said mounting bracket of the motor includes a plurality of projections from the periphery, the tip portion of each of said projections being capable of insertion into said groove formed in the bracket holding portion of the first case member.

4. The actuator according to claim 3, wherein at least that projection of said plural projections which is inserted into a bottom portion of the groove of the bracket holding portion includes a tip portion capable of elastic deformation such that, when said projection is inserted into the groove, said tip portion is pressed against the bottom portion of the groove so as to be elastically deformed.

5. An actuator for controlling operations of apparatus, comprising:

a first casing member having a first bracket holding portion and a second casing member having a second bracket holding portion, said bracket holding portions being configured to be in an aligned relationship when said casing members are joined to form a casing; and a drive mechanism positioned at least partially within said casing, said drive mechanism having a mounting bracket that includes a plurality of projections, each projection having a tip portion that can be inserted into a groove in said first bracket holding portion, and wherein at least a portion of said second bracket holding portion presses against said mounting bracket when said casing is formed.

6. The actuator according to claim 5, wherein said portion of said second bracket holding portion pressing against said mounting bracket includes an elastic member.

7. The actuator according to claim 5, wherein at least one projection of said plurality of projections includes a tip portion capable of elastic deformation such that when said projection is inserted into said groove and said casing is formed said tip portion is deformed within said groove and pushes said mounting bracket toward said second bracket holding portion.

8. The actuator according to claim 5, wherein said drive mechanism comprises a motor.

9. The actuator according to claim 8, wherein said motor includes a shaft having a gear attached thereto.

10. The actuator according to claim 9, wherein said gear comprises a worm gear.

11. The actuator according to claim 10 further comprising an operating section having a worm wheel that meshes with said worm gear, wherein said operating section can be coupled to the apparatus in which said actuator is controlling the operation thereof such that rotational movement of said shaft is translated from said worm gear to said worm wheel and movement of said worm wheel can be translated to the apparatus.

12. The actuator according to claim 5 further comprising an operating section that can be coupled to the apparatus in which said actuator is controlling the operation thereof.

13. The actuator according to claim 12, wherein said operating section translates movement of said drive mechanism to movement of the apparatus being controlled.

14. The actuator according to claim 5, wherein said mounting bracket comprises a flat plate that is received by said groove in said first bracket holding portion.

15. The actuator according to claim 5, wherein said portion of said second bracket holding portion pressing against said mounting bracket presses against a portion of said flat plate.

* * * * *